United States Patent
Kano et al.

(10) Patent No.: US 9,170,670 B2
(45) Date of Patent: Oct. 27, 2015

(54) PORTABLE ELECTRONIC DEVICE

(71) Applicant: PANASONIC CORPORATION, Osaka (JP)

(72) Inventors: Hidekazu Kano, Tokyo (JP); Mitsuru Satou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 74 days.

(21) Appl. No.: 14/234,491

(22) PCT Filed: Feb. 15, 2013

(86) PCT No.: PCT/JP2013/000851
§ 371 (c)(1),
(2) Date: Jan. 23, 2014

(87) PCT Pub. No.: WO2013/157178
PCT Pub. Date: Oct. 24, 2013

(65) Prior Publication Data
US 2014/0313145 A1    Oct. 23, 2014

(30) Foreign Application Priority Data
Apr. 17, 2012   (JP) ................ 2012-094099

(51) Int. Cl.
| G06F 3/041 | (2006.01) |
| G06F 3/042 | (2006.01) |
| G06F 3/043 | (2006.01) |
| G06F 3/044 | (2006.01) |
| G06F 3/045 | (2006.01) |
| G06F 3/046 | (2006.01) |
| G06F 3/047 | (2006.01) |
| G06F 3/01  | (2006.01) |
| G06F 1/16  | (2006.01) |

(52) U.S. Cl.
CPC ............. *G06F 3/041* (2013.01); *G06F 3/016* (2013.01); *G06F 1/1694* (2013.01); *G06F 2203/04101* (2013.01); *G06F 2203/04108* (2013.01)

(58) Field of Classification Search
USPC ......... 345/173–178; 178/18.01–18.09, 18.11; 340/4.12, 407.1, 407.2
See application file for complete search history.

(56) References Cited

U.S. PATENT DOCUMENTS

| 2009/0322497 A1* | 12/2009 | Ku et al. ................. 340/407.2 |
| 2011/0210947 A1  | 9/2011  | Kawaguchi et al. |
| 2012/0056829 A1* | 3/2012  | Kasahara et al. ............ 345/173 |

FOREIGN PATENT DOCUMENTS

| JP | 04-006594 A | 1/1992 |
| JP | 7-013676    | 1/1995 |

(Continued)

OTHER PUBLICATIONS

U.S. Appl. No. 14/164,458 to Tomoki Takano et al., which was filed Jan. 27, 2014.

(Continued)

*Primary Examiner* — Charles V Hicks
*Assistant Examiner* — Jeffrey S Steinberg
(74) *Attorney, Agent, or Firm* — Greenblum & Bernstein, P.L.C.

(57) ABSTRACT

A portable electronic device includes a touch panel and a vibration unit. The touch panel being capable of detecting at least a distance between a pointer and the touch panel when the pointer is not in contact with the touch panel. The vibration unit vibrates when the distance between the pointer and the touch panel is not larger than a first distance and then reaches a second distance or more.

7 Claims, 3 Drawing Sheets

(56) References Cited

FOREIGN PATENT DOCUMENTS

| JP | 10-097366 A | 4/1998 |
| JP | 2002-259044 | 9/2002 |
| JP | 2003-316519 | 11/2003 |
| JP | 2011-257899 | 12/2011 |
| JP | 2012-058881 A | 3/2012 |
| WO | WO2010/038822 | 4/2010 |

OTHER PUBLICATIONS

U.S. Appl. No. 14/164,521 to Tomoki Takano et al., which was filed Jan. 27, 2014.
U.S. Appl. No. 14/235,878 to Mitsuru Satou, which was filed Jan. 29, 2014.
International Search Report for PCT/JP2013/00851, mail date is Mar. 12, 2013.
Japan Decision to Grant a Patent, mail date is Dec. 9, 2014.

\* cited by examiner

PORTABLE ELECTRONIC DEVICE

TECHNICAL FIELD

The present invention relates to a portable electronic device using a touch panel as an input device.

BACKGROUND ART

An example of an input device using a touch panel has been described in Patent Literatures 1 and 2. In a pen-type input device described in Patent Literature 1, a distance between the input device and the touch panel is detected, and vibration is generated when the input device approaches the touch panel within a predetermined distance, so that an advance notice of the approach of a pen tip to the touch panel can be given to a user. On the other hand, in an input device described in Patent Literature 2, vibration is generated to prevent erroneous operation such as erroneous input when a finger moves beyond a predetermined region with reference to a position where the finger has been placed on the touch panel.

PRIOR ART LITERATURE

Patent Literature

Patent Literature 1: JP-A-2002-259044
Patent Literature 2: JP-A-2003-316519

SUMMARY OF THE INVENTION

Technical Problem to be Solved by the Invention

For example, an electrostatic capacitance type touch panel can detect a conductive pointer such as a fingertip or a pen when the pointer is not in contact with the touch panel. However, when an operation is performed on the touch panel in a non-contact manner using the pointer such as the fingertip or the pen within a predetermined range of height (this operation is also referred to as "proximity operation"), the user cannot judge the operable range. For this reason, the user may move his/her finger out of the operable range unintentionally. Particularly, when the user is walking, the distance between the touch panel and the finger is not stable. Therefore, it is highly frequent that the finger moves out of the operable range to thereby lead to poor operability.

The invention has been accomplished in consideration of the aforementioned circumstances. An object of the invention is to provide a portable electronic device which is provided with a touch panel using such a system that an operation can be performed on the touch panel in a non-contact manner using a pointer such as a fingertip or a pen within a predetermined range of height and which can make a user surely recognize an operable range.

Solution to Problem

The portable electronic device according to the invention includes a touch panel and a vibration unit, the touch panel is capable of detecting at least a distance between a pointer and the touch panel when the pointer is not in contact with the touch panel, and the vibration unit vibrates when the distance between the pointer and the touch panel is not larger than a first distance and then reaches a second distance or more.

According to the above configuration, vibration is generated when the pointer such as a fingertip or a pen moves out of an operable range. Accordingly, a user can recognize the operable range surely so that the operability can be improved.

In the aforementioned configuration, the first distance is equal to the second distance.

In the aforementioned configuration, the first distance is smaller than the second distance.

In the aforementioned configuration, the vibration unit vibrates when a time for which the distance is the second distance or more does not exceed a predetermined time, and the vibration unit does not vibrate when the time for which the distance is the second distance or more exceeds the predetermined time.

According to the aforementioned configuration, vibration is generated when movement of the pointer such as the fingertip or the pen out of the operable range is unintentional. Accordingly, the user can recognize the operable range surely so that the operability can be improved.

In the aforementioned configuration, an acceleration sensor which detects acceleration of a body of the portable electronic device is provided. The vibration unit vibrates when an output of the acceleration sensor is not smaller than predetermined acceleration and when the time for which the distance is the second distance or more does not exceed the predetermined time. The vibration unit does not vibrate when the output of the acceleration sensor is smaller than the predetermined acceleration or when the time for which the distance is the second distance or more exceeds the predetermined time.

According to the aforementioned configuration, vibration is generated when the user who is, for example, walking moves the pointer such as the fingertip or the pen out of the operable range unintentionally. Accordingly, the user can recognize the operable range surely so that the operability can be improved.

In the aforementioned configuration, the vibration unit performs vibration based on a first vibration pattern when the time for which the distance is the second distance or more does not exceed the predetermined time, and the vibration unit performs vibration based on a second vibration pattern different from the first vibration pattern when the time for which the distance is the second distance or more exceeds the predetermined time.

According to the aforementioned configuration, vibration is generated based on the first vibration pattern when movement of the pointer such as the fingertip or the pen out of the operable range is unintentional, and vibration is generated based on the second vibration pattern when the movement of the pointer out of the operable range is intentional. Accordingly, the user can recognize the operable range surely so that the operability can be improved.

In the aforementioned configuration, the vibration unit includes at least one of a vibrator, a piezoelectric actuator and a vibration actuator.

Advantageous Effects of Invention

According to the invention, the user can recognize the operable range surely when the user performs an operation on the touch panel in a non-contact manner using the pointer such as the fingertip or the pen within a predetermined range of height. Thus, the operability can be improved.

DESCRIPTION OF EMBODIMENT

A preferred embodiment for carrying out the invention will be described below in detail with reference to the drawings.

Figure 1:
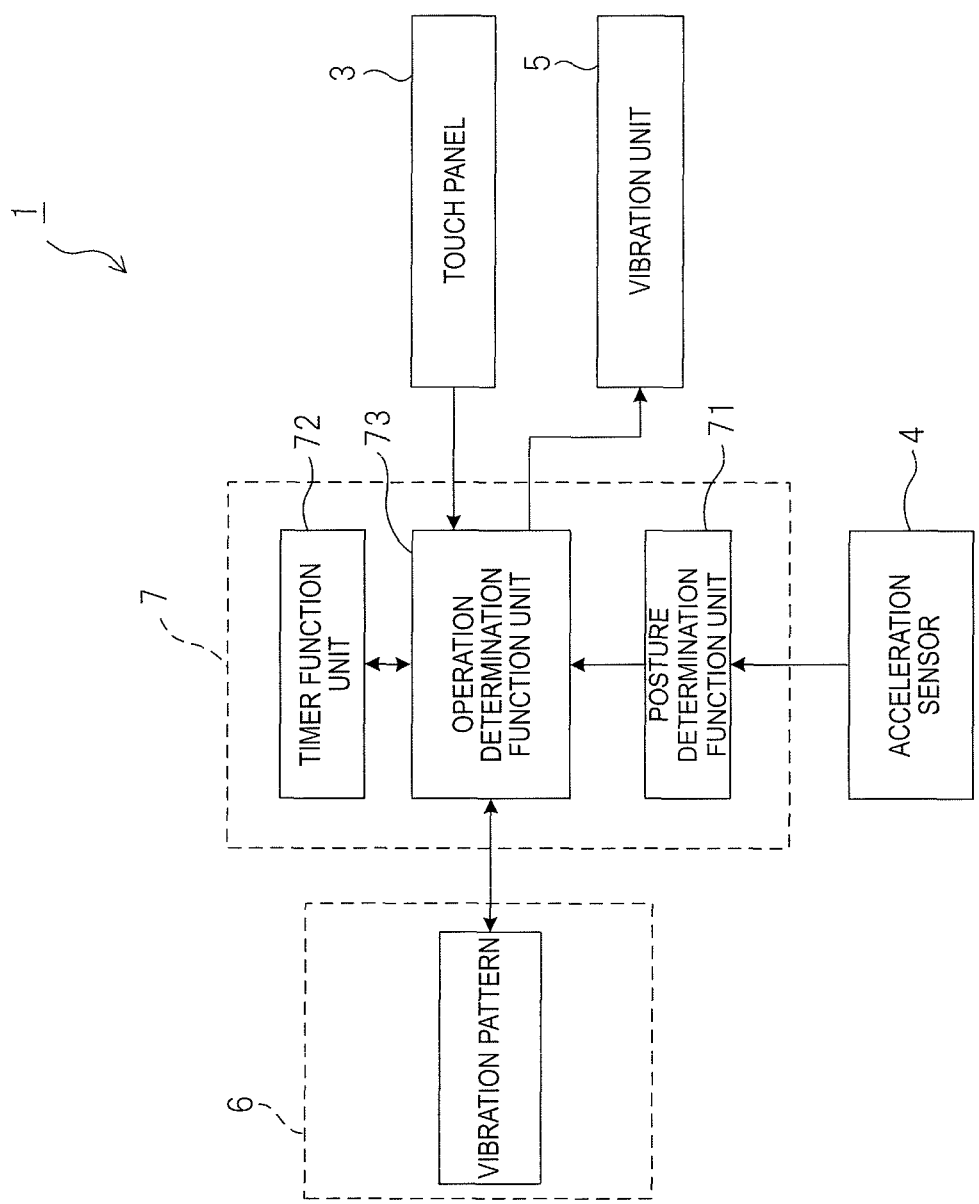
FIG. 1 is a block diagram showing a schematic configuration of a touch panel operation portion of a portable electronic device according to an embodiment of the invention.

FIG. 1 is a block diagram showing a schematic configuration of a touch panel operation portion of a portable electronic device according to an embodiment of the invention. In FIG. 1, a portable electronic device 1 according to the embodiment includes a touch panel 3, an acceleration sensor 4, a vibration unit 5, a storage unit 6, and a control unit 7. For example, the touch panel 3 is an electrostatic capacitance type touch panel which is disposed on a not-shown display portion (e.g. a liquid crystal display). The touch panel 3 has a normal function of outputting, as position information, a coordinate position designated on the panel by a touch operation of a user. In addition, the touch panel 3 has a function of detecting at least the distance between a pointer (assumed as a "fingertip" in the embodiment) such as a human's fingertip or a pen and the touch panel 3 when the pointer is not in contact with the touch panel 3.

The acceleration sensor 4 is provided inside a body of the portable electronic device 1. The acceleration sensor 4 detects acceleration applied to the portable electronic device 1. The vibration unit 5 generates mechanical vibration when a control signal is outputted from the control unit 7. For example, the vibration unit 5 has at least one of a vibrator, a piezoelectric actuator and a vibration actuator. The storage unit 6 stores data determining a vibration pattern of the vibration unit 5. In the storage unit 6, a rewritable nonvolatile memory such as a flash memory is used to make it possible to rewrite the data of the vibration pattern. The control unit 7 is constituted by a CPU (Central Processing Unit), a ROM (Read Only Memory), a RAM (Random Access Memory), and an interface circuit. The control unit 7 has various function units such as a posture determination function unit 71, a timer function unit 72 and an operation determination function unit 73. A program for controlling the CPU is stored in the ROM. The RAM serves as a work memory used in operation of the CPU.

The posture determination function unit 71 of the control unit 7 determines whether, for example, the user is walking and the posture of the portable electronic device 1 is unstable or not, based on the output of the acceleration sensor 4. The acceleration during walking is larger than acceleration in a still state. Accordingly, when the output of the acceleration sensor 4 is not smaller than predetermined acceleration (acceleration whose magnitude exceeds that in the still state), the posture determination function unit 71 of the control unit 7 determines that, for example, the user is walking. The timer function unit 72 of the control unit 7 measures a time for which the distance between the fingertip and the touch panel 3 is a second distance or more when the distance between the fingertip and the touch panel 3 is not larger than a first distance but then reaches at least the second distance which is larger than the first distance. Incidentally, the second distance does not have to be always larger than the first distance. The second distance may be set to be equal to the first distance.

The operation determination function unit 73 of the control unit 7 operates the vibration unit 5 based on the vibration pattern stored in the storage unit 6 when the output of the acceleration sensor 4 is not smaller than the predetermined acceleration and when the time for which the distance between the fingertip and the touch panel 3 is the second distance or more does not exceed a predetermined time. On the other hand, the operation determination function unit 73 of the control unit 7 does not operate the vibration unit 5 when the output of the acceleration sensor 4 is smaller than the predetermined acceleration or when the time for which the distance between the fingertip and the touch panel 3 is the second distance or more exceeds the predetermined time. In this manner, the operation determination portion 73 of the control unit 7 generates vibration when the user who is, for example, walking moves his/her fingertip out of an operable range unintentionally. Accordingly, the user can recognize the operable range surely so that the operability can be improved.

Incidentally, the posture of the portable electronic device 1 may be determined not only based on the magnitude of the output of the acceleration sensor 4 but also by use of a period or an acceleration direction.

Next, operation of the portable electronic device 1 according to the embodiment will be described.

Figure 2:
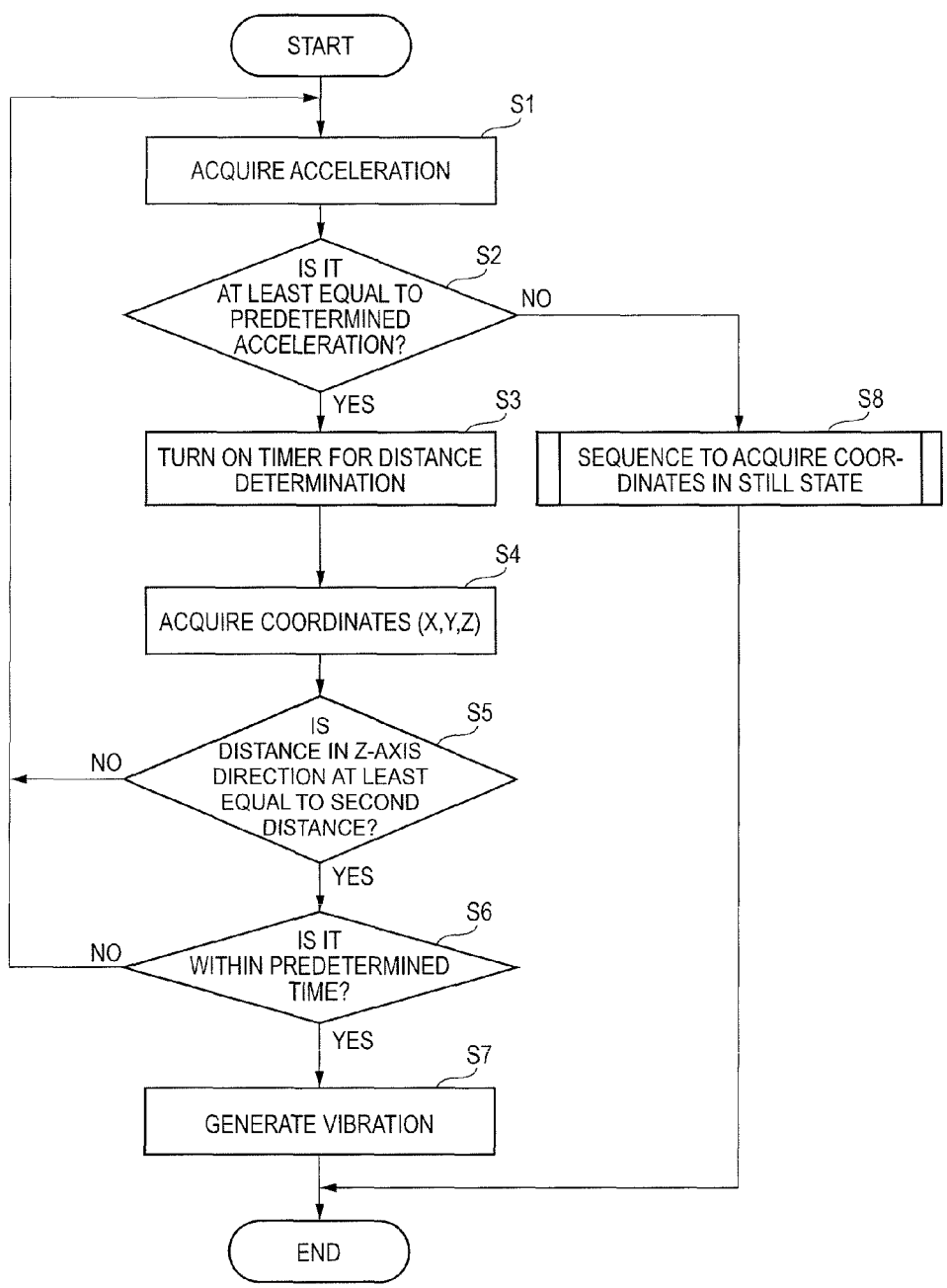
FIG. 2 is a flow chart for explaining a touch panel operation process of the portable electronic device in FIG. 1.

FIG. 2 is a flow chart for explaining a touch panel operation process of the portable electronic device 1 according to the embodiment. In FIG. 2, first, the posture determination function unit 71 of the control unit 7 acquires the output of the acceleration sensor 4 (step S1), and determines whether the output of the acceleration sensor 4 is at least equal to the predetermined acceleration or not (step S2). When the output of the acceleration sensor 4 is at least equal to the predetermined acceleration (resulting in conclusion as "Yes" in the step S2), the timer function unit 72 of the control unit 7 turns on a timer for distance determination (step S3). Then, the operation determination function unit 73 of the control unit 7 acquires coordinates (X,Y,Z) of the fingertip on the touch panel 3 (step S4) when the output of the acceleration sensor 4 is at least equal to the predetermined acceleration.

After acquiring the coordinates (X,Y,Z) of the fingertip, the operation determination function unit 73 determines whether the distance in the Z-axis direction is at least equal to a second distance or not (step S5). When the distance in the Z-axis direction is smaller than the second distance (resulting in conclusion as "No" in the step S5), the operation determination function unit 73 does not perform any process but returns to the step S1. On the other hand, when the distance in the Z-axis direction is at least equal to the second distance (resulting in conclusion as "Yes" in the step S5), the operation determination function unit 73 determines whether the time for which the fingertip is separated by a distance at least equal to the second distance is within a predetermined time or not (step S6). When the time for which the fingertip is separated by a distance at least equal to the second distance exceeds the predetermined time (resulting in conclusion as "No" in the step S6), the operation determination function unit 73 does not perform any process but returns to the step S1. When the time for which the fingertip is separated by a distance at least equal to the second distance is within the predetermined time (resulting in conclusion as "Yes" in the step S6), the operation determination function unit 73 reads a vibration pattern stored in the storage unit 6 and outputs to the vibration unit 5 a control signal for vibrating the vibration unit 5 based on the vibration pattern (step S7). In this manner, vibration occurs from the vibration unit 5. The operation determination function unit 73 terminates the process after outputting the control signal to the vibration unit 5.

On the other hand, when it is determined in the step S2 that the acquired acceleration is smaller than the predetermined acceleration (resulting in conclusion as "No" in the step S2), the flow of processing shifts to a sequence to acquire coordinates in a still state of a user (step S8). After the sequence is performed, the process is terminated.

Thus, the portable electronic device 1 according to the embodiment has the touch panel 3, the vibration unit 5, and the acceleration sensor 4 which detects acceleration of the body of the portable electronic device 1. When the fingertip is not in contact with the touch panel 3, the distance between the fingertip and the touch panel 3 is detected. When the output of the acceleration sensor 4 is not smaller than the predetermined acceleration and when the time for which the distance between the fingertip and the touch panel 3 is the second distance or more does not exceed the predetermined time, the vibration unit 5 is vibrated. When the output of the acceleration sensor 4 is smaller than the predetermined acceleration or when the time for which the distance between the fingertip and the touch panel 3 is the second distance or more exceeds the predetermined time, the vibration unit 5 is not vibrated. Thus, the user can recognize the operable range surely as long as the use who is, for example, walking does not intentionally move the fingertip out of the operable range. Thus, the operability can be improved.

Incidentally, the portable electronic device 1 according to the embodiment is designed to vibrate the vibration unit 5 when the output of the acceleration sensor 4 is not smaller than the predetermined acceleration and when the time for which the distance between the fingertip and the touch panel 3 is the second distance or more does not exceed the predetermined time. However, the portable electronic device 1 may be designed to vibrate the vibration unit 5 simply when the distance between the fingertip and the touch panel 3 is not larger than the first distance but then reaches at least the second distance.

Alternatively, configuration may be made so that the vibration unit 5 is vibrated when the time for which the distance between the fingertip and the touch panel 3 is the second distance or more is measured and the measured time does not exceed the predetermined time, and the vibration unit 5 is not vibrated when the time for which the distance is the second distance or more exceeds the predetermined time. In this manner, vibration is generated in the case where movement of the fingertip out of the operable range is unintentional. Accordingly, the user can recognize the operable range surely so that the operability can be improved.

Figure 3:
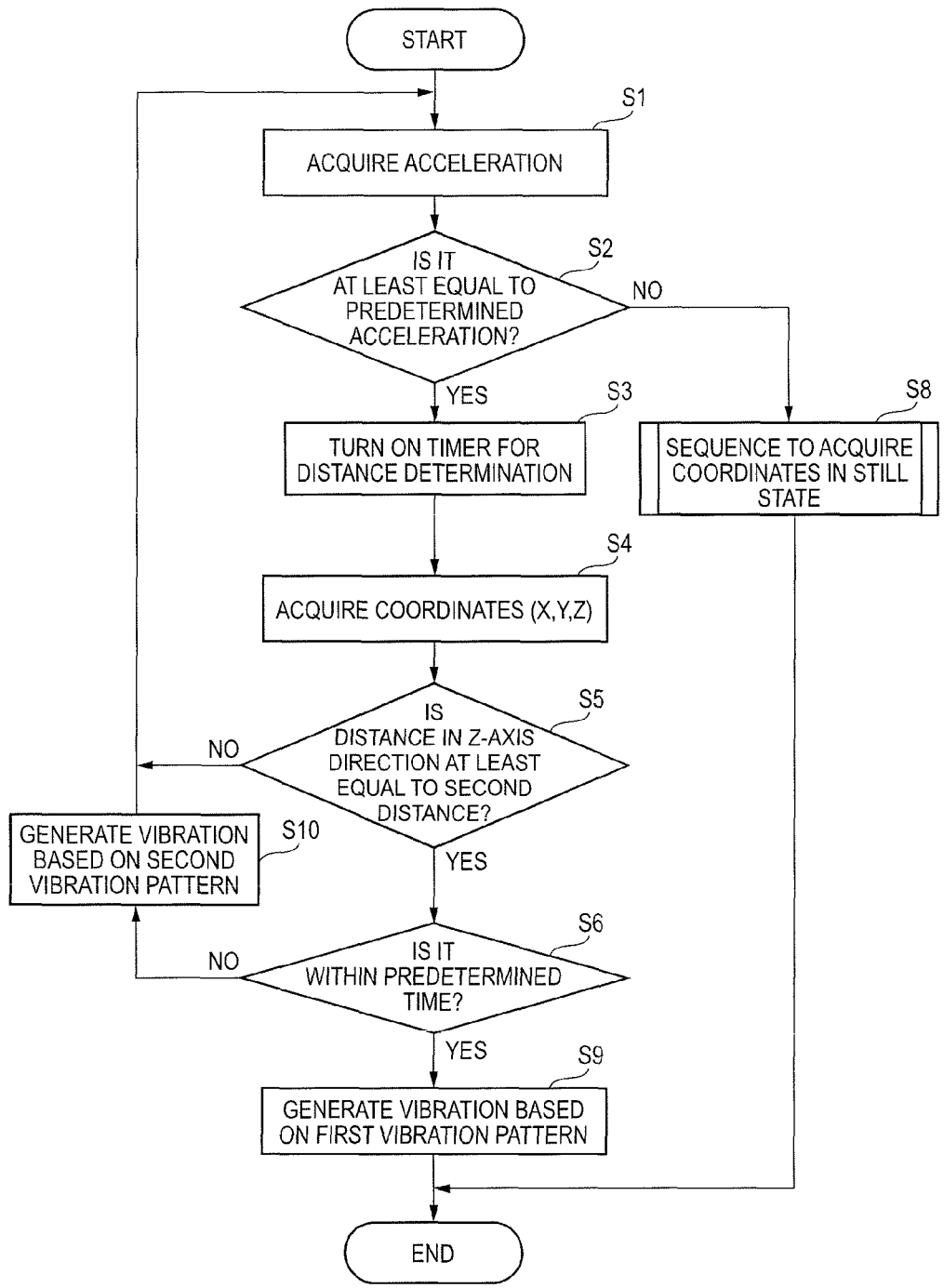
FIG. 3 is a flow chart for explaining a touch panel operation process of an application example of the portable electronic device in FIG. 1.

In addition, although the portable electronic device 1 according to the embodiment is designed to generate vibration based on one kind of vibration pattern, the portable electronic device 1 may be designed to generate vibration based on two or more kinds of vibration patterns. When, for example, two different kinds of vibration patterns are used, a first vibration pattern and a second vibration pattern are stored in the storage unit 6. The operation determination function unit 73 of the control unit 7 reads the first vibration pattern from the storage unit 6 and vibrates the vibration unit 5 based on the first vibration pattern when the time for which the distance between the fingertip and the touch panel 3 is the second distance or more does not exceed the predetermined time. The operation determination function unit 73 of the control unit 7 reads the second vibration pattern from the storage unit 6 and vibrates the vibration unit 5 based on the second vibration pattern when the time for which the distance between the fingertip and the touch panel 3 is the second distance or more exceeds the predetermined time. FIG. 3 is a flow chart for explaining a touch panel operation process when the two kinds of vibration patterns are provided. The processing in the steps S1 to S5, the step S6, and the step S8 is the same as that in FIG. 2 so that description thereof will be omitted.

In FIG. 3, when determining that the time for which the fingertip is separated by a distance at least equal to the second distance is within the predetermined time (resulting in conclusion as "Yes" in the step S6), the operation determination function unit 73 reads the first vibration pattern from the storage unit 6 and outputs to the vibration unit 5 a control signal for vibrating the vibration unit 5 based on the first vibration pattern (step S9). When determining that the time for which the fingertip is separated by a distance at least equal to the second distance exceeds the predetermined time (resulting in conclusion as "No" in the step S6), the operation determination function unit 73 reads the second vibration pattern from the storage unit 6 and outputs to the vibration unit 5 a control signal for vibrating the vibration unit 5 based on the second vibration pattern (step S10).

Thus, vibration is performed based on the first vibration pattern when movement of the fingertip out of the operable range is unintentional, and vibration is performed based on the second vibration pattern when movement of the fingertip out of the operable range is intentional. In this manner, the user can recognize the operable range surely so that the operability can be improved.

In addition, although a program in which the process expressed by the flow chart in FIG. 2 or FIG. 3 is described is held in the ROM in the portable electronic device 1 according to the embodiment, configuration may be made in such a manner that the program can be stored and distributed in a storage medium such as a magnetic disc, an optical disc, a magneto-optical disc or a flash memory or the program can be stored in a server (not shown) on a network such as the Internet to be downloaded therefrom using an electric communication line.

Although the invention has been described in detail and with reference to a specific embodiment, it is obvious to those skilled in the art that various changes or modifications may be made without departing from the scope and spirit of the invention.

The present application is based on a Japanese patent application (Patent Application No. 2012-094099) filed on Apr. 17, 2012, the contents of which are incorporated herein by reference.

INDUSTRIAL APPLICABILITY

The present invention has an effect that a user can surely recognize an operable range in a portable electronic device which is provided with a touch panel using such a system that an operation can be performed on the touch panel in a non-contact manner using a pointer such as a fingertip or a pen within a predetermined range of height. Thus, the invention can be applied to a portable electronic device using an electrostatic capacitance type touch panel such as a smartphone.

REFERENCE SIGNS LIST

1 portable electronic device
3 touch panel
4 acceleration sensor
5 vibration unit
6 storage unit
7 control unit
71 posture determination function unit
72 timer function unit
73 operation determination function unit

The invention claimed is:

1. A portable electronic device comprising:
   a touch panel; and
   a vibration unit;
   wherein the touch panel is capable of detecting at least a distance between a pointer and the touch panel when the pointer is not in contact with the touch panel;
   wherein the vibration unit vibrates when the distance between the pointer and the touch panel is not larger than a first distance and then reaches a second distance or more and a time for which the distance is the second distance or more does not exceed a predetermined time; and
   wherein the vibration unit does not vibrate when the time for which the distance is the second distance or more exceeds the predetermined time.

2. The portable electronic device according to claim 1, further comprising:
   an acceleration sensor which detects acceleration of a body of the portable electronic device;
   wherein the vibration unit vibrates when an output of the acceleration sensor is not smaller than predetermined acceleration and when the time for which the distance is the second distance or more does not exceed the predetermined time; and
   wherein the vibration unit does not vibrate when the output of the acceleration sensor is smaller than the predetermined acceleration or when the time for which the distance is the second distance or more exceeds the predetermined time.

3. A portable electronic device comprising:
   a touch panel; and
   a vibration unit;
   wherein the touch panel is capable of detecting at least a distance between a pointer and the touch panel when the pointer is not in contact with the touch panel;
   wherein the vibration unit performs vibration based on a first vibration pattern when the distance between the pointer and the touch panel is not larger than a first distance and then reaches a second distance or more and when the time for which the distance is the second distance or more does not exceed the predetermined time; and
   wherein the vibration unit performs vibration based on a second vibration pattern different from the first vibration pattern when the time for which the distance is the second distance or more exceeds the predetermined time.

4. The portable electronic device according to claim 1, wherein the vibration unit includes at least one of a vibrator, a piezoelectric actuator and a vibration actuator.

5. The portable electronic device according to claim 3, wherein the vibration unit includes at least one of a vibrator, a piezoelectric actuator and a vibration actuator.

6. The portable electronic device according to claim 1, wherein the first distance is equal to the second distance.

7. The portable electronic device according to claim 1, wherein the first distance is smaller than the second distance.

* * * * *